(12) United States Patent
Seok et al.

(10) Patent No.: US 11,812,381 B2
(45) Date of Patent: Nov. 7, 2023

(54) WIDEBAND CHANNEL ACCESS METHODOLOGY AND SYSTEM FOR WIRELESS STATIONS

(71) Applicant: MediaTek Singapore Pte. Ltd., Singapore (SG)

(72) Inventors: Yongho Seok, San Jose, CA (US); Chao-Chun Wang, San Jose, CA (US); James Chih-Shi Yee, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/701,604

(22) Filed: Mar. 22, 2022

(65) Prior Publication Data

US 2022/0217631 A1 Jul. 7, 2022

Related U.S. Application Data

(63) Continuation of application No. 16/208,360, filed on Dec. 3, 2018, now Pat. No. 11,310,736.

(60) Provisional application No. 62/594,040, filed on Dec. 4, 2017.

(51) Int. Cl.
*H04W 52/02* (2009.01)
*H04W 88/06* (2009.01)
*H04W 72/0453* (2023.01)
*H04L 5/00* (2006.01)
*H04W 72/04* (2023.01)
*H04W 72/20* (2023.01)

(52) U.S. Cl.
CPC ....... *H04W 52/0216* (2013.01); *H04L 5/0035* (2013.01); *H04W 52/0219* (2013.01); *H04W 72/04* (2013.01); *H04W 72/0453* (2013.01); *H04W 72/20* (2023.01); *H04W 88/06* (2013.01)

(58) Field of Classification Search
CPC . H04W 52/0216; H04W 72/04; H04W 88/06; H04W 72/0406; H04W 52/0219; H04W 72/0453; H04L 5/0035
See application file for complete search history.

(56) References Cited

U.S. PATENT DOCUMENTS

2016/0316455 A1* 10/2016 Asterjadhi ............ H04W 72/04
2016/0360443 A1* 12/2016 Hedayat .............. H04W 74/006

* cited by examiner

*Primary Examiner* — Dady Chery

(57) ABSTRACT

Embodiments of the present invention provide a method and apparatus for providing wideband channel access to wireless devices, such as 20 MHz only wireless stations. A trigger frame is transmitted by a wireless AP to a wireless STA over a secondary wireless channel. An HE TB PPDU is received by the wireless AP from the wireless STA over the secondary wireless channel responsive to the trigger frame. The devices can switch operating channels for wireless communication to the secondary wireless channel within an existing TXOP.

18 Claims, 8 Drawing Sheets

TWT Element Format

WIDEBAND CHANNEL ACCESS METHODOLOGY AND SYSTEM FOR WIRELESS STATIONS

CROSS-REFERENCE TO RELATED APPLICATIONS

This application claims the benefit of and priority to provisional patent application Ser. No. 62/594,040, with filing date Dec. 4, 2017, and is a continuation of copending patent application Ser. No. 16/208,360, with filing date Dec. 3, 2018, both of which are hereby incorporated by reference in their entirety.

FIELD

Embodiments of the present invention generally relate to the field of wireless communications. More specifically, embodiments of the present invention relate to systems and methods for efficiently managing channel access for wireless access points.

BACKGROUND

The 2.4 GHz and 5 GHz Wi-Fi signal ranges are divided into a series of smaller channels, and Wi-Fi network equipment (e.g., a wireless access point or station) is able to communicate data using these channels. When a wireless AP is transmitting data, different channels may be influenced by different sources of wireless interference, and the type and amount of interference may change over time. Therefore, a typical wireless AP will switch channels intermittently based on the levels of interferences detected on the current channel.

Some wireless stations are only capable of sending and receiving data using 20 MHz channel bandwidth (e.g., a "20 MHz only" device). Presently, these devices are limited to a primary 20 MHz width operating channel. However, limiting devices to operating on a primary 20 MHz width operating channel may cause poor network performance. What is needed is a technique for transmitting data using a 20 MHz only wireless device that allows the 20 MHz only device to use a different operating channel at times to improve network performance.

SUMMARY

Accordingly, embodiments of the present invention provide a method and system for transmitting data using a 20 MHz only wireless device that allow the 20 MHz only device to use a different operating channel at times to improve network performance. More specifically, embodiments of the present invention provide wideband access to wireless stations such that a second 20 MHz bandwidth channel (e.g., a secondary channel or a temporary primary channel) can be accessed to improve the efficiency of the wireless network, particularly in the case of 20 MHz only devices.

Embodiments of the present invention provide a method and apparatus for providing wideband channel access to wireless devices, such as 20 MHz only wireless stations. A trigger frame is transmitted by a wireless AP to a wireless STA over a secondary wireless channel. An HE TB PPDU is received by the wireless AP from the wireless STA over the secondary wireless channel responsive to the trigger frame. The devices can switch operating channels for wireless communication to the secondary wireless channel within an existing TXOP.

According to one embodiment, a method of switching operating channels in a wireless network is disclosed. The method includes transmitting data to a wireless station (STA) over a primary wireless channel, transmitting a trigger frame to the wireless STA during a TXOP over the primary wireless channel and a secondary wireless channel, receiving an HE TB PPDU from the wireless STA over the secondary wireless channel responsive to the trigger frame, configuring an operating channel for communicating with the wireless STA to the secondary wireless channel, and transmitting data to the wireless STA over the secondary wireless channel.

According to some embodiments, the trigger frame is received by the wireless STA during a trigger MAC padding duration According to some embodiments, the trigger MAC padding duration comprise 8 μs or 16 μs.

According to some embodiments, the method includes transmitting an acknowledgement frame to the wireless STA responsive to the receiving the HE TB PPDU.

According to some embodiments, the wireless STA is a 20 MHz only STA.

According to some embodiments, the method includes configuring the operating channel for communicating with the wireless STA to the primary channel after the TXOP has expired.

According to some embodiments, the HE TB PPDU comprises a channel width subfield comprising a value of 40 MHz, 80 MHz, 160 MHz, or 80+80 MHz indicating support for wideband channel access.

According to some embodiments, the HE TB PPDU comprises a channel width subfield comprising a value of 20 MHz indicating a request to move back to the primary wireless channel.

According to another embodiment, a method of switching operating channels in a wireless network is disclosed. The method includes receiving data from a wireless access point (AP) over a primary wireless channel, receiving a trigger frame from the wireless AP during a TXOP over the primary wireless channel and a secondary wireless channel, transmitting an HE TB PPDU to the wireless AP over the secondary wireless channel responsive to the trigger frame, switching an operating channel for communicating with the wireless AP to the secondary wireless channel, and receiving data from the wireless AP over the secondary wireless channel.

According to another embodiment, the receiving the trigger frame from the wireless AP is performed during a trigger MAC padding duration.

According to another embodiment, the trigger MAC padding duration comprise 8 μs or 16 μs.

According to another embodiment, the method includes receiving an acknowledgement frame from the wireless STA responsive to the transmitting the HE TB PPDU.

According to another embodiment, the method includes switching the operating channel for communicating with the wireless AP to the primary channel after the TXOP has expired.

According to another embodiment, the HE TB PPDU comprises a channel width subfield comprising a value of 40 MHz, 80 MHz, 160 MHz, or 80+80 MHz indicating support for wideband channel access.

According to another embodiment, the HE TB PPDU comprises a channel width subfield comprising a value of 20 MHz indicating a request to move back to the primary wireless channel.

According to another embodiment, a device for providing wideband channel access to a 20 MHz only wireless station is disclosed. The device includes a memory for storing data, and a processor communicatively coupled to the memory and configured to execute instructions for providing wideband channel access. The method includes transmitting data to a wireless station (STA) over a primary wireless channel, transmitting a trigger frame to the wireless STA during a TXOP over the primary wireless channel and a secondary wireless channel, receiving an HE TB PPDU from the wireless STA over the secondary wireless channel responsive to the trigger frame, and configuring an operating channel for communicating with the wireless STA to the secondary wireless channel.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
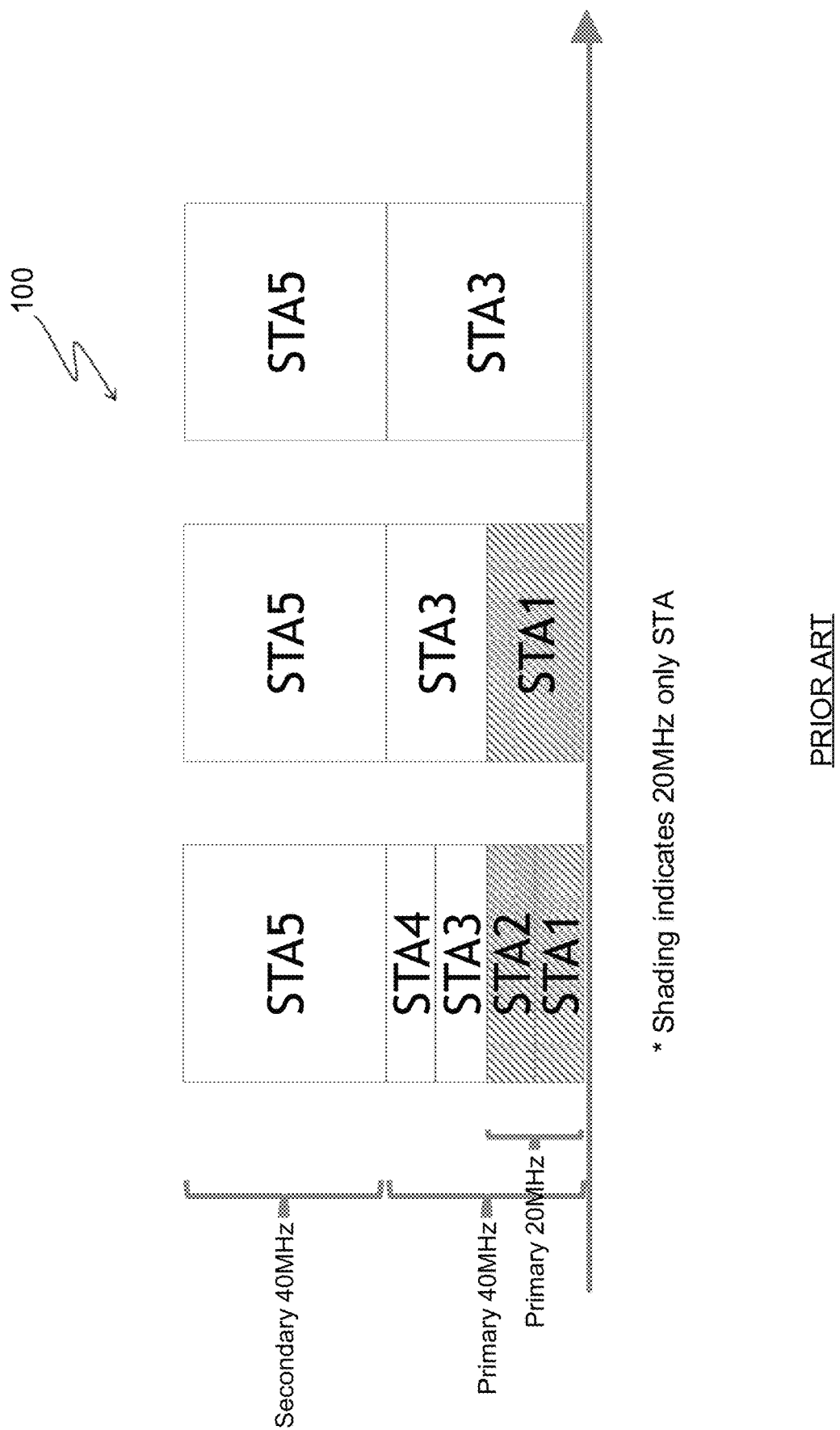
FIG. 1 is a transmission diagram depicting an exemplary wireless channel selection for a mixed group of 20 MHZ only STAs and 80 MHz capable STAs.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 6 and 7) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "associating," "identifying," "encoding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Wideband Channel Access for 20 Mhz Only Wireless Stations

Embodiments of the present invention provide a method and apparatus for providing wideband channel access to wireless devices, such as 20 MHz only wireless stations. A Target Wakeup Time (TWT) Channel field contains a bitmap indicating a temporary primary channel for using during a TWT Service Period (SP). The temporary primary channel is determined through a negotiation between a requesting STA and a responding STA (e.g., an HE AP), and the responding STA assigns resource units (RUs) to the requesting STA according to the temporary primary channel. A frame send by the responding STA (e.g., a trigger frame) causes the requesting STA to operate on the temporary primary channel during the TWT SP. Thereafter, the requesting STA switches back to a primary channel.

As used herein, the term "HE" may refer to a high efficiency frame format or protocol defined according to the IEEE 802.11ax standards. The term "HE STA" may refer to a wireless station capable of operating according to protocols defined by the IEEE 802.11ax standards, and the term "HE AP" may refer to a wireless access point capable of operating according to protocols defined by the IEEE 802.11ax. The term "non-HE" may refer to a legacy frame format or protocol defined, for example, by the IEEE 802.11a/g/n/ac standards. Further, term "non-HE STA" may refer to a wireless station that may operate in accordance with the IEEE 802.11a/g/n/ac standards but not the IEEE 802.11ax standards, and the term "non-HE AP" may refer to a wireless access point that may operate in accordance with the IEEE 802.11a/g/n/ac standards but not the IEEE 802.11ax standards.

A 20 MHz only non-AP HE STA is a non-AP HE STA that indicates support for only a 20 MHz channel width for the frequency band in which it is operating. The non-AP HE STA may indicate this in the Channel Width Set subfield in a HE PHY Capabilities Information field of a HE Capabilities element that it transmits, for example. A 20 MHz operating non-AP HE STA is a non-AP HE STA that is operating in 20 MHz channel width mode, such as a 20 MHZ only non-AP HE STA or an HE STA that reduced its operating channel width to 20 MHz using operating mode indication (OMI), for example, when operating in a power save (PS) mode.

With regard to FIG. 1, a transmission diagram of a traditional wireless channel selection 100 for orthogonal frequency-division multiple access (OFDMA) transmission using both 20 MHZ only STAs and 80 MHz capable STAs is depicted. 20 MHZ only STAs are indicated in figure by shading. As depicted in FIG. 1, STA1 and STA2 are 20 MHZ only STAs and STA3-STA5 are 80 MHz capable STAs. The 20 MHZ only STAs can only operate on the primary 20 MHz channel. Because a 20 MHz only STA can use only a primary 20 MHz channel, the performance of the 20 MHz only STA is limited. For example, STA1 and STA2 can only transmit on the primary 20 MHz channel and are unable to switch to other available channels. As described above, RU restrictions are enforced when allocating to 20 MHZ only. Therefore, in order for an AP to utilize the entire 80 MHz bandwidth available, it is desirable for a 20 MHz only STA to participate in a wideband OFDMA.

Figure 2:
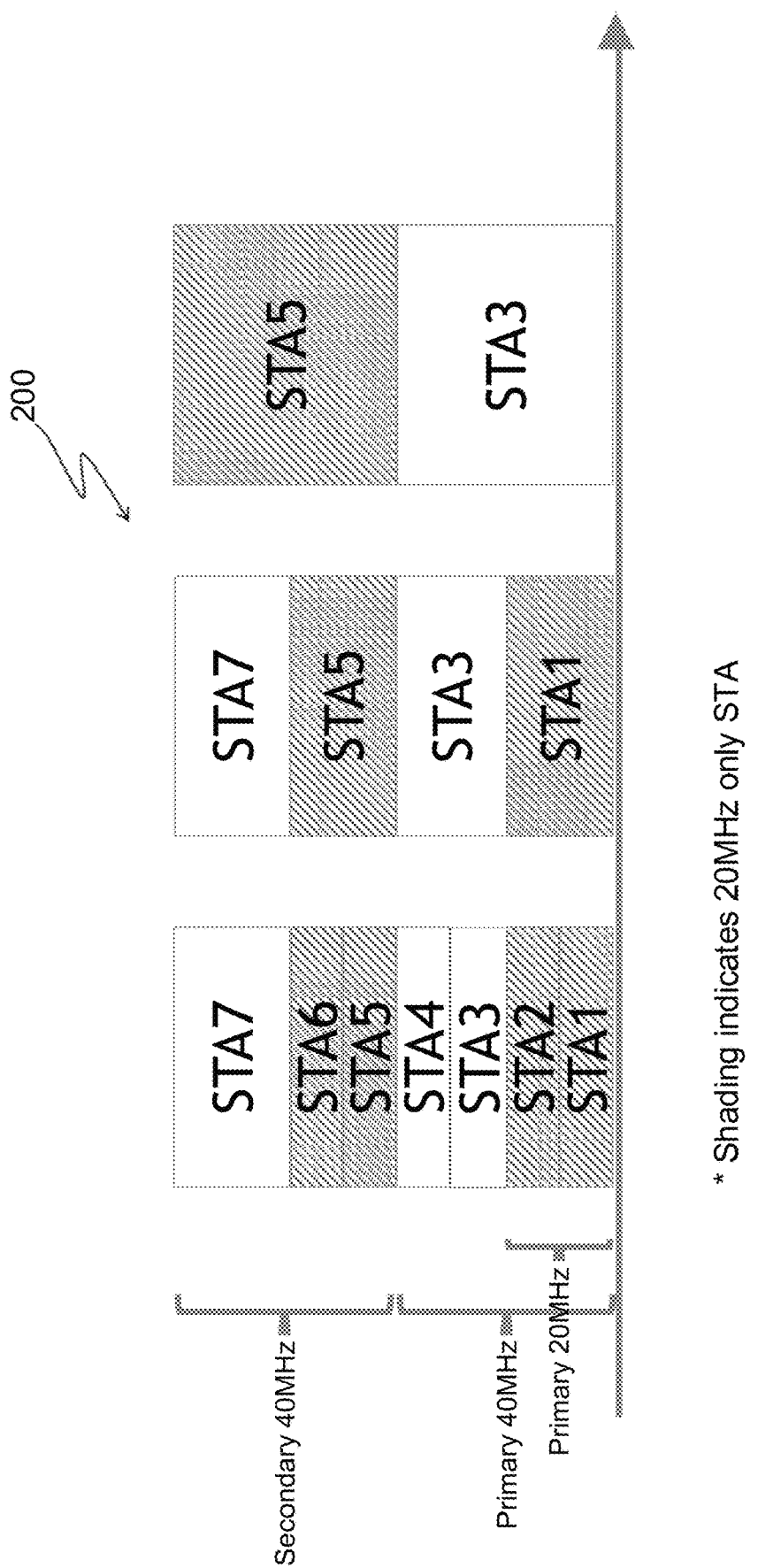
FIG. 2 is a transmission diagram depicting an exemplary wireless channel selection using wideband channel access for a mixed group of 20 MHZ only STAs and 80 MHz capable STAs according to embodiments of the present invention.

With regard to FIG. 2, a transmission diagram of an exemplary wireless channel selection 200 for OFDMA implemented using a wideband channel access technique is depicted according to embodiments of the present invention. 20 MHZ only STAs are indicated in figure by shading. The wideband channel access technique allows 20 MHZ only STAs to dynamically move to a secondary channel for sending and receiving data, where the AP coordinates the operating channel switch of the 20 MHz only STA. As depicted in FIG. 2, the 20 MHZ only STAs STA1-STA3 and STA5-STA6 may operate on the primary 20 MHz channel or switch to a secondary channel using a wideband channel access technique. For example, while STA1 and STA2 occupy the primary 20 MHz channel, STA5 and STA6 operate on the secondary 40 MHz channel. In this way, the STAs are able to make use of available channel bandwidth and the performance and reliability of the underlying network is improved.

Figure 3:
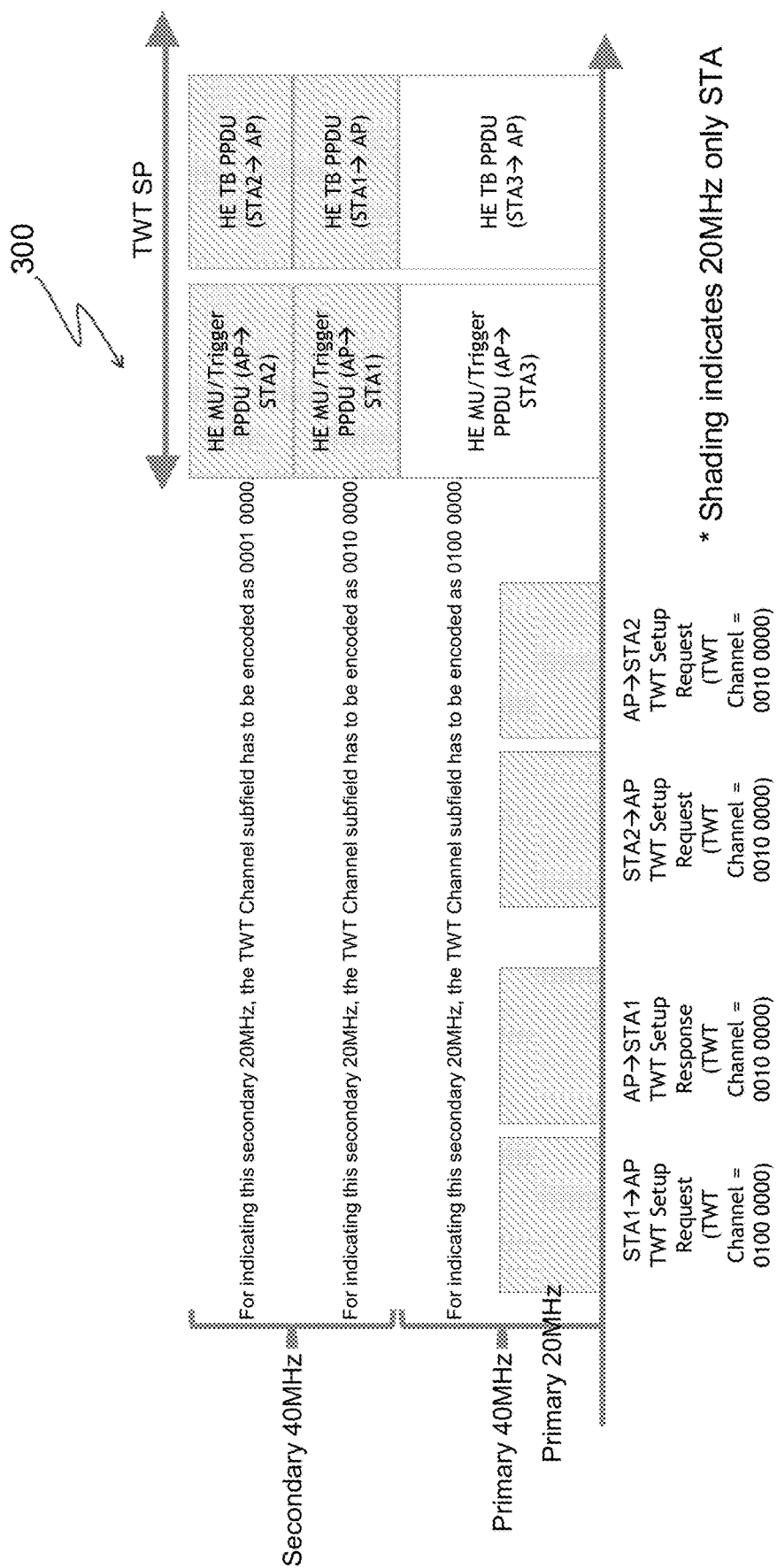
FIG. 3 is a transmission diagram depicting an exemplary wireless channel selection using a TWT (Target Wakeup Time) setup request according to embodiments of the present invention.

With regard to FIG. 3, a transmission diagram of an exemplary wireless channel selection 300 for OFDMA implemented using a Target Wakeup Time (TWT) mechanism (e.g., as defined in 802.11ah) is depicted according to embodiments of the present invention. 20 MHZ only STAs are indicated in figure by shading. A TWT requesting STA and a TWT responding STA may set up a TWT for enabling frame exchanges on a non-primary 20 MHz subchannel. A TWT setup request sent by a requesting STA indicates which single channel the requesting STA selects as a temporary primary channel during a TWT Service Period (SP). This may be accomplished by setting a single bit to '1' within a TWT Channel field of a TWT element. The field containing the single bit set to '1' may be mapped to a specific channel, for example, using a bitmap or other encoding technique. During the TWT SP, access to a channel that is not the primary channel of the basic service set (BSS) may be performed according to a subchannel selective transmission technique (e.g., as defined in 802.11ah).

As depicted in FIG. 3, A TWT responding STA (e.g., an HE AP) may schedule the same TWT SP for a 20 MHZ only STA supporting a temporary primary channel operation; however, a temporary primary channel specified in the TWT Channel field from the TWT responding STA may be different for each 20 MHZ only STAs. Outside of the TWT SP, a 20 MHZ only STA can still access the medium on the primary channel using a distributed coordination function (DCF) and Enhanced Distributed Channel Access (EDCA). In the embodiment depicted in FIG. 3, STA1 and STA2 negotiate with the AP to determine the secondary 20 MHz channel. For example, STA1 sends a TWT setup request indicating a TWT Channel using a bitmap 01000000. The AP responds to the TWT setup request with a TWT setup response indicating a TWT channel using a different bitmap 00100000. Similarly, STA2 sends a TWT setup request indicating a TWT Channel using a bitmap 00100000. The AP responds to the TWT setup request with a TWT setup response indicating the same TWT channel.

During the TWT SP, the AP transmits a downlink HE MU Protocol Data Unit (PPDU) to STA1 and STA2, and the STAs respond to the AP by transmitting an uplink HE TB PPDU back to the AP. The STA1's RU in the downlink HE MU PPDU is within the negotiated secondary channel (e.g., the lower 20 MHz channel of the secondary 40 MHz channel) of the STA1 and the STA2's RU in the downlink HE MU PPDU is within the negotiated secondary channel (e.g., the upper 20 MHz channel of the secondary 40 MHz channel) the of the STA2. When the AP solicits an acknowledgement frame from the STA1 and STA2, the downlink HE MU PPDU contains the Trigger frame. The STA1's RU in the Trigger frame is within the negotiated secondary channel (e.g., the lower 20 MHz channel of the secondary 40 MHz channel) of the STA1 and The STA2's RU in the Trigger frame is within the negotiated secondary channel (e.g., the lower 20 MHz channel of the secondary 40 MHz channel) of the STA2.

During the TWT SP, the AP transmits a downlink HE MU PPDU to STA3, and the STA respond to the AP by transmitting an uplink HE TB PPDU back to the AP. Because the STA3 is a 80 MHz capable STA, the AP does not have any restriction about the RU allocation in the downlink HE MU PPDU and the Trigger frame transmissions. For the downlink HE MU PPDU and the Trigger frame transmissions addressed to the STA3, the AP schedules the RU for STA3 within the primary 80 MHz.

Temporary primary channel operating during TWT SP may be prohibited according to some standards (e.g., 802.11ax). Therefore, an individual TWT agreement may be negotiated between an HE STA and another HE STA, and the HE STA sets the TWT Channel subfield in the TWT element being transmitted to '0'. However, the TWT Channel subfield in the TWT element being transmitted is not set to '0' when the STA is a 20 MHz only STA that has declared support for a temporary primary channel operation by setting a Channel Width subfield in the OM Control field to 40 MHz, 80 MHz, 160 MHz, or 80+80 MHz. According to some embodiments, the TWT Channel subfield includes or references an encoded list of channels (e.g., a bitmap) that indicates a temporary primary channel during the TWT SP.

The proposed wideband channel access technique described here with regard to FIG. 3 includes the following TWT Channel field definition.

When transmitted by a TWT requesting STA that is not neither an S1G STA nor a 20 MHZ only STA supporting a temporary primary channel operation, the TWT Channel field is reserved. When transmitted by a TWT requesting STA that is either an S1G STA or a 20 MHz only STA supporting a temporary primary channel operation, the TWT Channel field contains a bitmap indicating which channel the STA requests to use as a temporary primary channel during a TWT SP. When transmitted by a TWT responding STA that is either an S1G STA or a 20 MHz only STA supporting a temporary primary channel operation, the TWT Channel field contains a bitmap indicating which channel the TWT requesting STA is allowed to use as a temporary channel during the TWT SP, where each bit in the bitmap corresponds to one minimum width channel for the band in which the TWT responding STA's associated BSS is currently operating, with the least significant bit corresponding to the lowest numbered channel of the operating channels of the BSS.

In an S1G BSS, the minimum width channel is equal to the SST Channel Unit field of the SST Operation element if such an element has been previously received or is equal to 1 MHz for a BSS with a BSS primary channel width of 1 MHz and 2 MHz for a BSS with a BSS primary channel width of 2 MHz if no such element has been previously received from the AP to which the SST STA is associated. In an HE BSS, the minimum width channel is equal to 20 MHz for a BSS with a BSS primary channel width of 20 MHz.

A value of '1' in a bit position in the bitmap transmitted by a TWT requesting STA means that operation with that channel as the temporary primary channel is requested during a TWT SP. A value of '1' in a bit position in the bitmap transmitted by a TWT responding STA means that operation with that channel as the temporary primary channel is allowed during the TWT SP. The TWT Channel field is not present when the Broad-cast field has the value '1'. In an HE BSS, only one bit of the bitmap has a value of '1'.

During a TWT SP for a 20 MHZ only STA supporting temporary primary channel operation, a TWT responding STA (e.g., an HE AP) assigns the RU of the HE DL MU PPDU and HE TB PPDU addressed to the 20 MHz only STA within a temporary primary channel specified in the TWT Channel field from the TWT responding STA. Moreover, during the TWT SP, a TWT requesting STA (e.g., a 20 MHZ only STA supporting a temporary primary channel operation) moves to a temporary primary channel specified in the TWT Channel field from the TWT responding STA. However, the TWT requesting STA cannot access the medium on the temporary primary channel using a DCF and EDCA. Therefore, the corresponding TWT SP is an unannounced TWT (e.g., a Flow Type subfield is set to '1'). A value of 1 in the Flow Type subfield in Request Type field in the TWT element indicates an unannounced TWT in which the TWT responding STA will send a frame to the TWT requesting STA at TWT without waiting to receive a PS-Poll or an APSD trigger frame from the TWT requesting STA.

During the negotiated trigger-enabled TWT SPs, an HE AP that is under the TWT agreement allocates an RU within a secondary channel specified in the TWT Channel field of the TWT response frame and follow the RU restriction rules defined in RU restrictions for 20 MHz operation (see below) when allocating an RU in an HE MU PPDU or HE TB PPDU to a non-AP STA that is under the TWT agreement.

During the negotiated trigger-enabled TWT SPs, the non-AP STA that is under the TWT agreement moves to a secondary channel specified in the TWT Channel field of the TWT response frame. After moving into a new operation channel, the non-AP STA can perform a Clear Channel Assessment (CCA) until a frame is detected by which it can set its NAV, or until a period of time equal to a NAVSyncDelay field has passed. The negotiated trigger-enabled TWT SPs does not overlap with the TBTTs at which the TWT responding STA schedules for transmission DTIM Beacon frames. The TWT responding STA ensures that all negotiated trigger-enabled TWT SPs that are overlapping in time use the same secondary channel.

Figure 4:
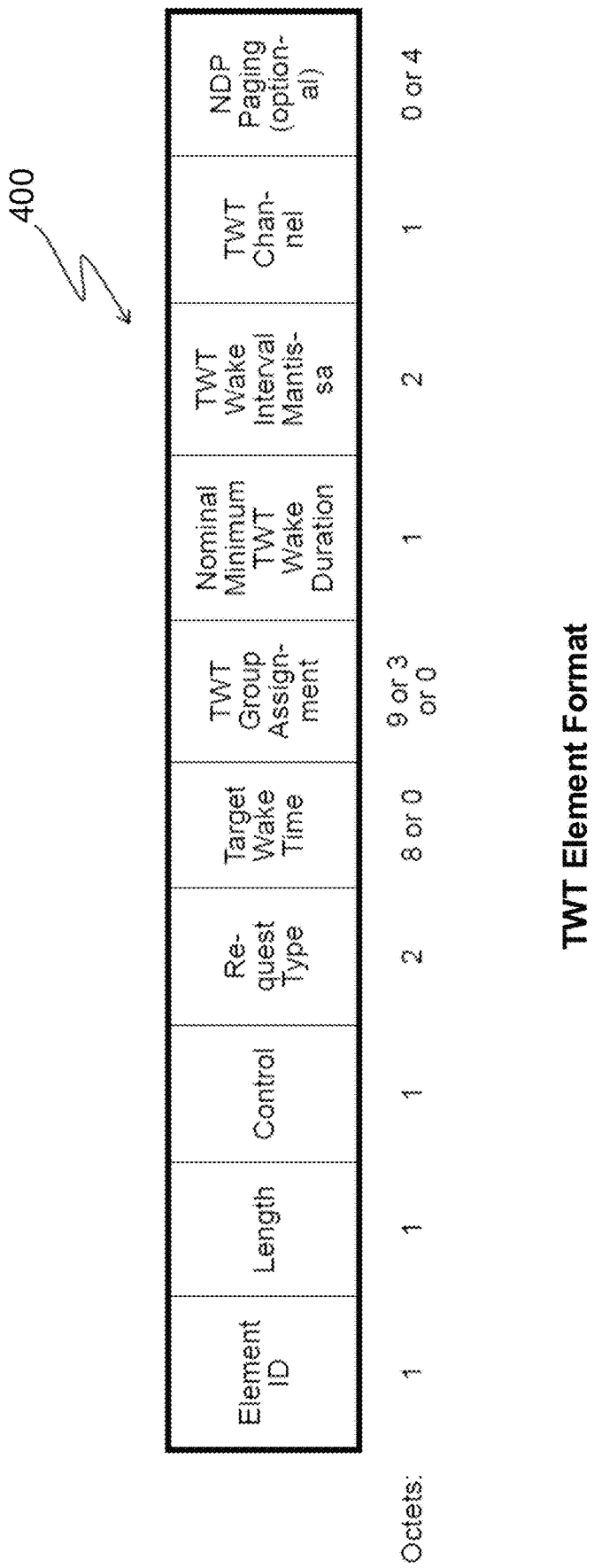
FIG. 4 is a block diagram depicting an exemplary TWT element format according to embodiments of the present invention.

With regard to FIG. 4, a block diagram of an exemplary TWT element format 400 is depicted according to embodiments of the present invention. The TWT element format 400 includes the following subfields: Element ID, Length, Control, Request Type, TWT, TWT Group Assignment, Nominal Minimum TWT Wake Duration, TWT Wake Interval Mantissa, TWT Channel, and NDP Paging (optional). A bit of the TWT Channel field (e.g., a bitmap) can be set to '1' during TWT SP by a TWTW requesting STA to indicate which channel the STA has selected as a temporary primary channel. A TWT responding STA can respond to the TWT requesting STA to indicate which single channel the requesting STA is permitted to use as a temporary primary channel by setting a bit of the TWT Channel field (e.g., a bitmap) to '1'.

Figure 5:
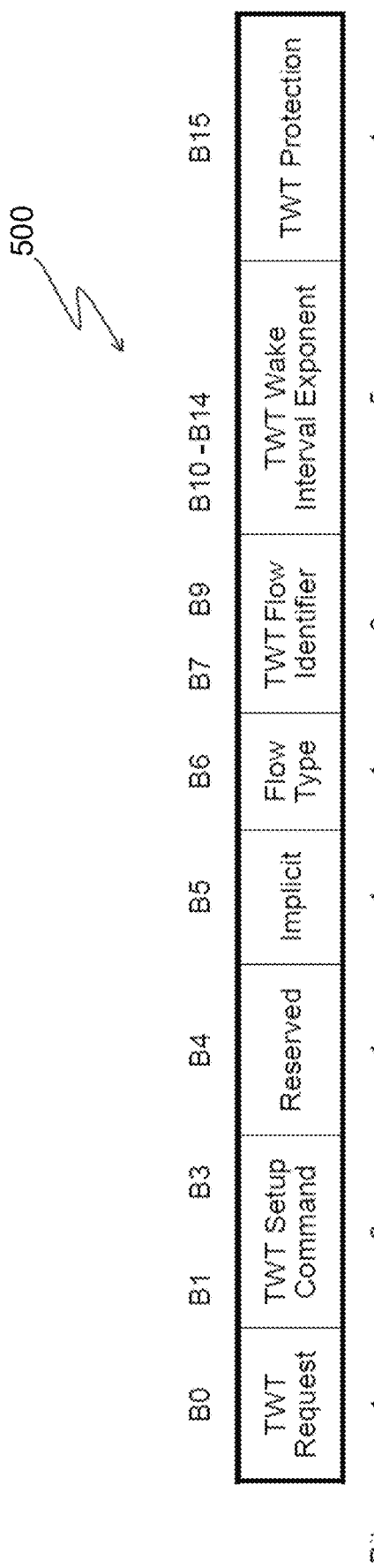
FIG. 5 is a block diagram depicting an exemplary TWT request type field format according to embodiments of the present invention.

With regard to FIG. 5, a block diagram of an exemplary TWT request type field format 500 is depicted according to embodiments of the present invention. The TWT request type field format 500 includes the following subfields: TWT Request, TWT Setup Command, Implicit, Flow Type, TWT Flow Identifier, TWT Wake Interval Exponent, and TWT Protection. A value of '1' in the Flow Type subfield indicates an unannounced TWT in which the TWT responding STA sends a frame to the TWT requesting STA at TWT without waiting to receive a PS-Poll or an APSD trigger frame from the requesting STA.

Figure 6:
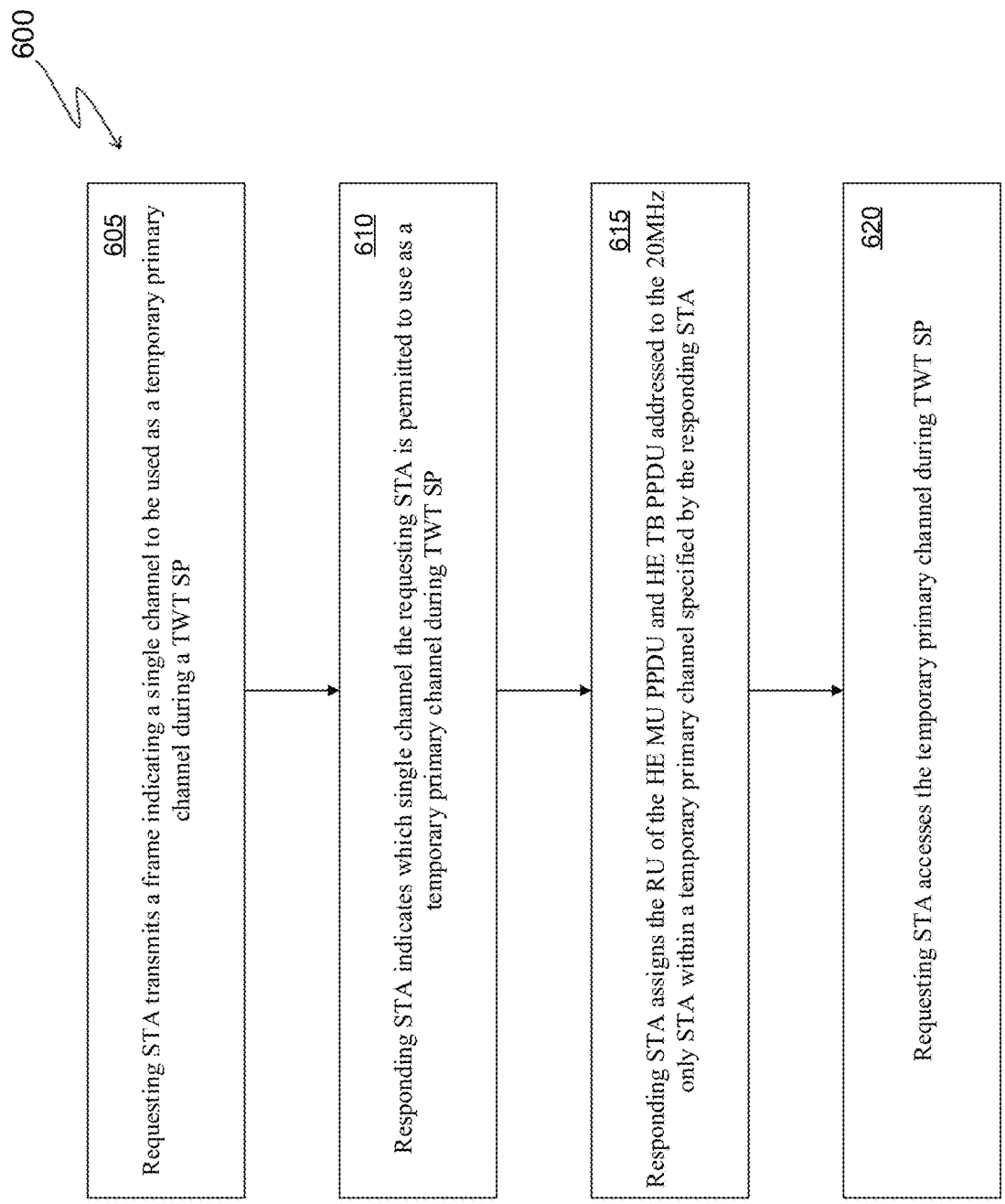
FIG. 6 is a flow chart of an exemplary sequence of computer implemented steps for automatically switching an operating channel of a 20 MHz only STA to a temporary primary channel using a TWT mechanism according to embodiments of the present invention.

With regard to FIG. 6, a flow chart of an exemplary sequence of computer implemented steps 600 for automatically switching an operating channel of a 20 MHz only STA to a temporary primary channel using a TWT mechanism is depicted according to embodiments of the present invention. At step 605, a requesting STA (e.g., a 20 MHz only STA) transmits a frame indicating a single channel to be used as a temporary primary channel during a TWT SP. For example, step 605 may include setting a single bit to '1' within a TWT Channel field of a TWT element, and the value of the TWT Channel field (e.g., a bitmap) is mapped to a specific channel number.

At step 610, the responding STA (e.g., an HE AP) indicates which single channel the requesting STA is permitted to use as a temporary primary channel during TWT SP. For example, step 610 may include setting a single bit to '1' within a TWT Channel field of a TWT element, and the value of the TWT Channel field (e.g., a bitmap) is mapped to a specific channel number. At step 615, still during TWT SP, the responding STA assigns RUs of the HE DL MU PPDU and HE TB PPDU frames within a temporary primary channel specified by the responding STA (e.g., in the TWT Channel field).

At step 620, during TWT SP, the requesting STA accesses (e.g., transmits on) the temporary primary channel, for example, according to Subchannel Selective Transmission (SST) procedures. After the TWT SP, the requesting STA can switch back to the previously used primary channel.

According to some embodiments, the TWT SP is an unannounced TWT, and a Flow Type field in the Request Type field of the TWT element is set to '1' to indicate the unannounced TWT. Therefore, the responding STA sends a frame to the TWT requesting STA without waiting to receive a PS-Poll or an APSD trigger frame from the TWT requesting STA. Outside of the TWT SP, the requesting STA can access the medium on the primary channel using a DCF and EDCA.

According to some embodiments, instead of utilizing the TWT mechanism defined in 802.11ah, a trigger frame is transmitted by an HE AP to request that a 20 MHz only STA switch operating channels to a specific secondary channel. The trigger frame transmitted by the HE AP assigns an RU (indicated by an RU Allocation field) within a requested secondary channel for the 20 MHz only STA. The 20 MHz only STA can move to the secondary channel after receiving a trigger frame during a Trigger MAC Padding duration (e.g., 8 us or 16 us). Thereafter, a HE TB PPDU frame is received by the HE AP in response to the trigger frame, and the operating channel switch to the requested secondary channel of the 20 MHz only STA is confirmed. During the Transmit Opportunity (TXOP), the HE AP assigns the RU of the HE DL MU PPDU and HE TB PPDU addressed to the 20 MHz only STA within the STA's secondary channel.

The 20 MHz only STA that responded to the trigger frame operates on the secondary channel until the end of the TXOP. The responding STA then moves back to the primary channel after the end of the TXOP. According to some embodiments, to improve the reliability of network communications, the 20 MHz only responding STA waits to receive an acknowledgement frame of the HE TB PPDU. After receiving the acknowledgment frame, the 20 MHz only responding STA remains operating on the secondary channel until the end of the TXOP. Otherwise, if the 20 MHz only responding STA does not receive an acknowledgement frame, the 20 MHz only responding STA moves back to the primary channel immediately.

An STA may signal its capabilities using an OM Control field (e.g., TOM indication or ROM indication). A Channel Width subfield of the OM Control field indicates the operating channel width supported by the STA for both reception and transmission. For example, a 20 MHz only STA can set the Channel Width subfield in the OM Control field to 20 MHz. Importantly, for a 20 MHz only STA that supports a Wideband Channel Access technique as described herein according to embodiments of the present invention, the 20 MHz only STA can declare the supported secondary channels for an operating channel switch by setting the Channel Width subfield in the OM Control field to 40 MHz/80 MHz/160 MHz or 80+80 MHz. Therefore, when an HE AP requests that the 20 MHz only STA move to a specific secondary operation channel, the secondary channel is chosen within a bandwidth value as specified in the Channel Width subfield in the OM Control field declared by the 20 MHz only STA. Moreover, for a 20 MHz only STA that previously declared support for a Wideband Channel Access technique by setting the Channel Width subfield in the OM Control field to 40 MHz/80 MHz/160 MHz or 80+80 MHz as described above, the 20 MHz only STA can disable the Wideband Channel Access technique at any time by setting the Channel Width subfield in the OM Control field to 20 MHz.

Figure 7:
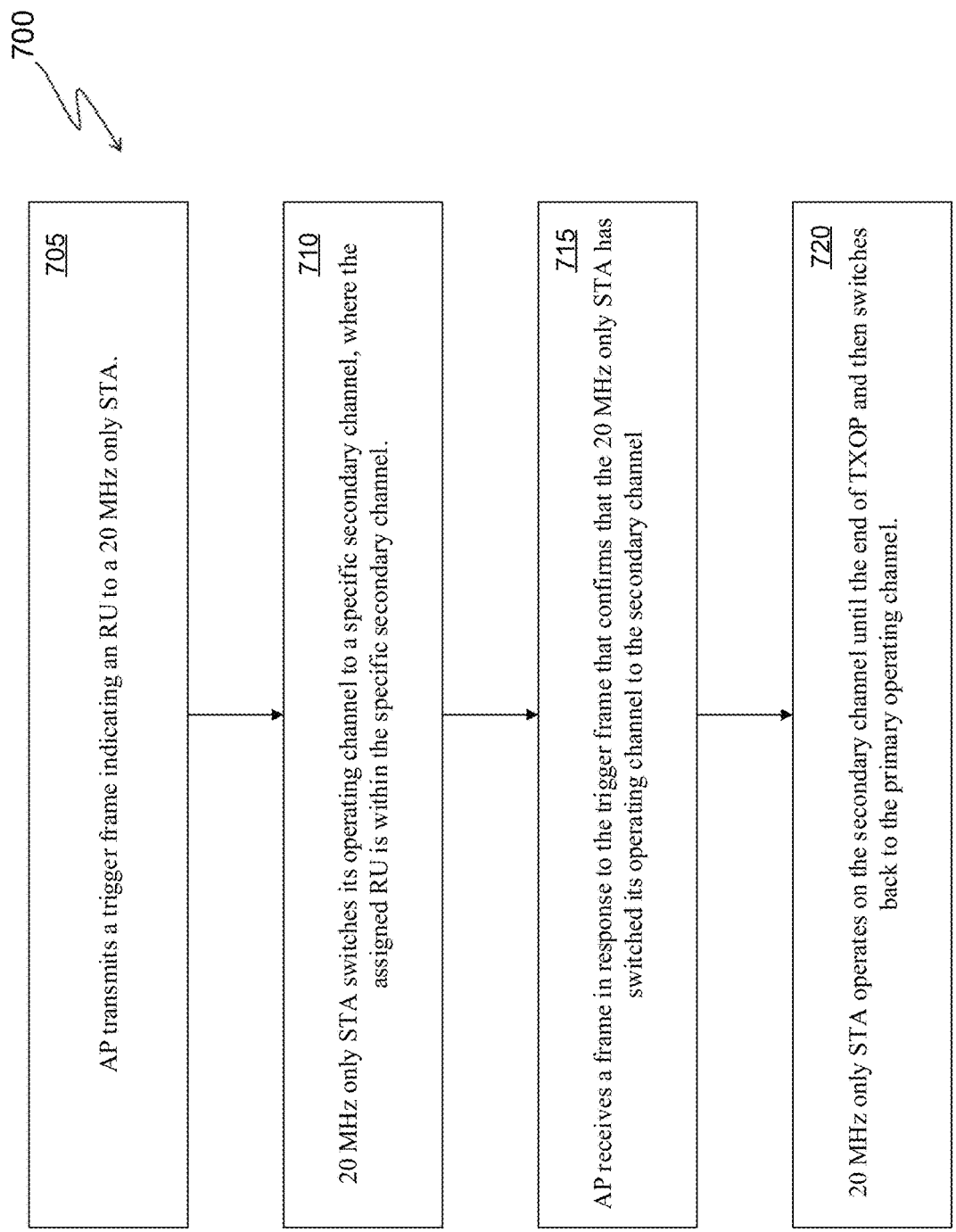
FIG. 7 is a flow chart of an exemplary sequence of computer implemented steps for automatically switching an operating channel of a 20 MHz only STA to a secondary channel using a trigger frame according to embodiments of the present invention.

With regard to FIG. 7, a flow chart of an exemplary sequence of computer implemented steps 700 for automatically switching an operating channel of a 20 MHz only STA to a secondary channel using a trigger frame is depicted according to embodiments of the present invention. At step 705, an AP (e.g., an HE AP) transmits a trigger frame indicating an RU to a 20 MHz only STA. For example, the trigger frame may include an RU Allocation field that specifies the assigned RU. In this way, at step 710, the trigger frame causes the 20 MHz only STA to switch its operating channel to a specific secondary channel, where the assigned RU is within the specific secondary channel. For example, the 20 MHz only STA may move to the secondary channel during a trigger MAC Padding duration. At step 715, the AP receives a frame (e.g., a HE TB PPDU) in response to the trigger frame that confirms that the 20 MHz only STA has switched its operating channel to the secondary channel. The 20 MHz only STA operates on the secondary channel until the end of TXOP. At step 720, at the end of the TXOP, the 20 MHz only STA switches back to the primary operating channel. According to some embodiments, the 20 MHz only STA moves back to the primary channel immediately unless an acknowledgement frame is received from the AP.

According to some embodiments, 20 MHz operating non-AP HE STAs are subject to certain rules and restrictions for transmitting and receiving data. For example, a 20 MHz operating non-AP HE STA operates in the primary 20 MHz channel. A HE AP in 5 GHz is able to interoperate with non-AP HE STAs, regardless of the indicated value of B1 in the Channel Width Set subfield in the HE PHY Capabilities Information field in the HE Capabilities element.

Moreover, a 20 MHz operating non-AP HE STA supports tone mapping of 26-tone RU, 52-tone RU, 106-tone RU and 242-tone RU for a 20 MHz HE PPDU (see Table 28-6 (Data and pilot subcarrier indices for RUs in a 20 MHz HE PPDU)) in the 2.4 GHz and 5 GHz frequency bands. A 20 MHz operating non-AP HE STA indicates support of tone mapping of 26-tone RU, 52-tone RU, and 106-tone RU for a 40 MHz HE PPDU in the 2.4 GHz frequency band in the 20 MHz In 40 MHz HE PPDU In 2.4 GHz Band subfield in the HE PHY Capabilities Information field in the HE Capabilities.

A 20 MHz operating non-AP HE STA supports tone mapping of 26-tone RU, 52-tone RU, and 106-tone RU, for 40 MHz HE PPDU in the 5 GHz frequency band, and for 80 MHz HE PPDU in the 5 GHz frequency band with the exception of RUs that are restricted from operation as specified in 28.3.3.6 (RU restrictions for 20 MHz operation).

A 20 MHz operating non-AP HE STA indicates support of tone mapping of 26-tone RU, 52-tone RU, and 106-tone RU for 80+80 MHz and 160 MHz HE PPDU in the 20 MHz In 160/80+80 MHz HE PPDU subfield in the HE PHY Capabilities Information field in the HE Capabilities element (see 9.4.2.237.3 (HE PHY Capabilities Information field)). A 20 MHz operating non-AP HE STA may support tone mapping of 242-tone RU, for the reception of 40 MHz HE MU PPDU (see Table 28-7 (Data and pilot subcarrier indices for RUs in a 40 MHz HE PPDU)) in the 2.4 GHz and 5 GHz frequency bands, and 80 MHz, 80+80 MHz and 160 MHz HE MU PPDU (see Table 28-8 (Data and pilot subcarrier indices for RUs in an 80 MHz HE PPDU)) in the 5 GHz frequency band. This support is indicated in the Channel Width Set subfield in the HE PHY Capabilities Information field of the HE Capabilities element (see 9.4.2.237.3 (HE PHY Capabilities Information field)).

Furthermore, according to some embodiments, STAs are subject to certain resource unit (RU) restrictions for 20 MHz operation. For example, When a 20 MHz operating non-AP HE STA is the receiver of a 40 MHz, 80 MHz, 80+80 MHz or 160 MHz HE MU PPDU, or the transmitter of a 40 MHz, 80 MHz, 80+80 MHz or 160 MHz HE TB PPDU, then the RU tone mapping in 20 MHz is not aligned with the 40 MHz, 80 MHz, 80+80 MHz or 160 MHz RU tone mapping. Moreover, an AP does not assign the following RUs to a 20 MHz operating non-AP HE STA:

- 26-tone RU 5 and 14 of a 40 MHz HE MU PPDU and HE TB PPDU
- 26-tone RU 5, 10, 14, 19, 24, 28 and 33 of an 80 MHz HE MU PPDU and HE TB PPDU
- 26-tone RU 5, 10, 14, 19, 24, 28 and 33 of the lower 80 MHz or upper 80 MHz of an 80+80 MHz and 160 MHz HE MU PPDU
- 26-tone RU 5, 10, 14, 19, 24, 28 and 33 of the lower 80 MHz or upper 80 MHz of an 80+80 MHz and 160 MHz HE TB PPDU
- 52-tone RU 5 and 12 of an 80 MHz HE MU PPDU or HE TB PPDU
- 52-tone RU 5 and 12 of the lower 80 MHz or upper 80 MHz of an 80+80 MHz and 160 MHz HE MU PPDU
- 106-tone RU 3 and 6 of an 80 MHz HE MU PPDU and HE TB PPDU
- 106-tone RU 3 and 6 of the lower 80 MHz or upper 80 MHz of an 80+80 MHz and 160 MHz HE MU PPDU
- 106-tone RU 3 and 6 of the lower 80 MHz or upper 80 MHz of an 80+80 MHz and 160 MHz HE TB PPDU
- The center 26-tone RU in the primary 20 MHz channel is not assigned to a non-AP STA when 20 MHz operating non-AP HE STAs are recipients of a 40 MHz, 80 MHz, 160 MHz, or 80+80 MHz HE MU PPDU.

It is optional whether all 242-tone RUs of non-AP STAs with 20 MHz operating channel width to be supported in 40 MHz, 80 MHz, 160 MHz, or 80+80 MHz HE MU PPDU, and it is indicated in the Channel Width Set subfield in the HE PHY Capabilities Information field of the HE Capabilities element. A 242-tone RU for a 40 MHz, 80 MHz, 160 MHz, or 80+80 MHz HE TB PPDU is not allocated to a 20 MHz operating non-AP HE STA.

Exemplary Computer System

Embodiments of the present invention are drawn to electronic systems for automatically advertising the expected delay when performing a channel switch using a wireless AP. The following discussion describes one such exemplary electronic system or computer system can be used as a platform for implementing embodiments of the present invention.

Figure 8:
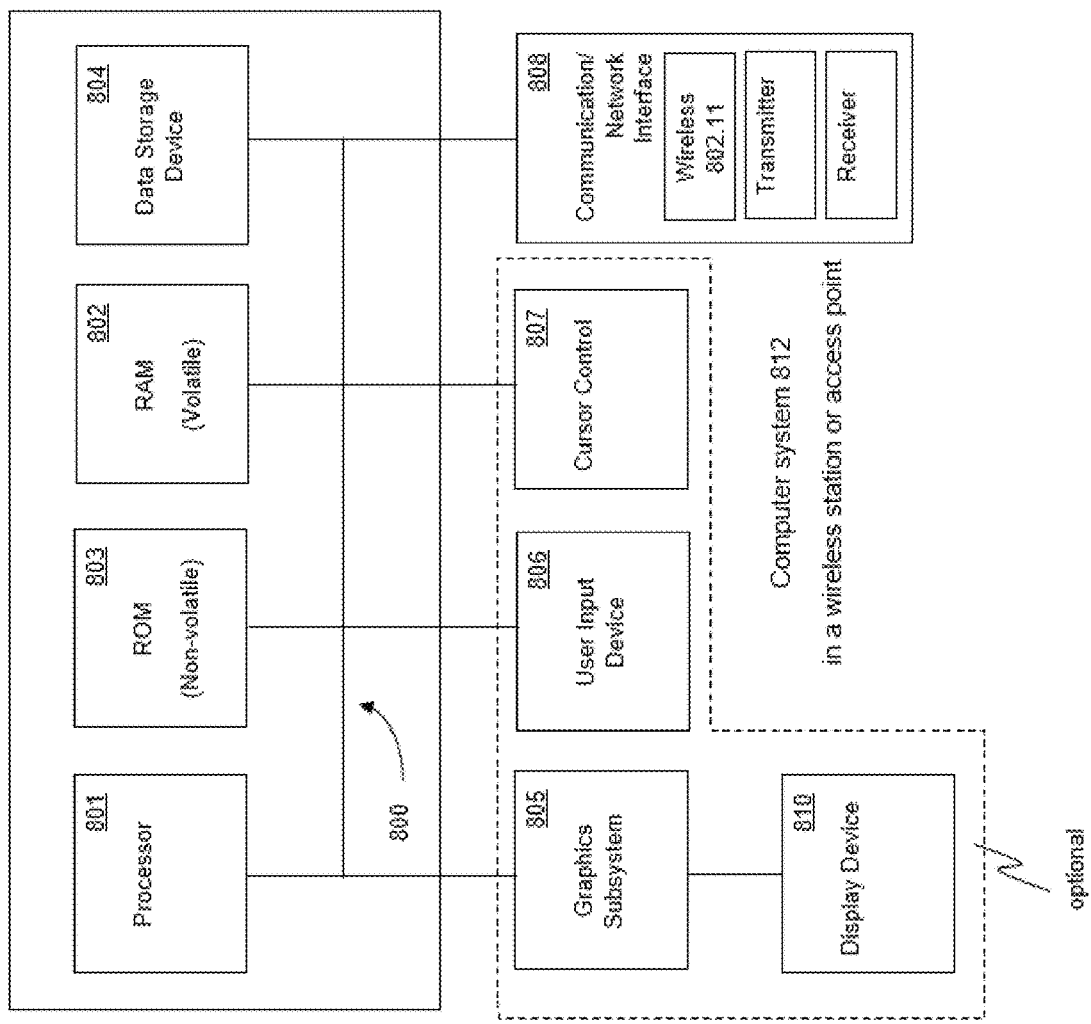
FIG. 8 is a block diagram of an exemplary computer system upon which embodiments of the present invention may be implemented.

In the example of FIG. 8, the exemplary computer system 812 (e.g., a wireless access point or wireless station) includes a central processing unit (CPU) 801 for running software applications and optionally an operating system. Random access memory 802 and read-only memory 803 store applications and data for use by the CPU 801. Data storage device 804 provides non-volatile storage for applications and data and may include fixed disk drives, removable disk drives, flash memory devices, and CD-ROM, DVD-ROM or other optical storage devices. The optional user inputs 806 and 807 comprise devices that communicate inputs from one or more users to the computer system 812 (e.g., mice, joysticks, cameras, touch screens, and/or microphones).

A communication or network interface 808 includes a transceiver and allows the computer system 812 to communicate with other computer systems, networks, or devices via an electronic communications network, including wired and/or wireless communication and including an Intranet or the Internet (e.g., 802.11 wireless standard). The optional display device 810 may be any device capable of displaying visual information in response to a signal from the computer system 812 and may include a flat panel touch sensitive display, for example. The components of the computer system 812, including the CPU 801, memory 802/803, data storage 804, user input devices 806, and graphics subsystem 805 may be coupled via one or more data buses 800.

In the embodiment of FIG. 8, an optional graphics subsystem 805 may be coupled with the data bus and the components of the computer system 812. The graphics system may comprise a physical graphics processing unit (GPU) 805 and graphics/video memory. GPU 805 may include one or more rasterizers, transformation engines, and geometry engines, and generates pixel data from rendering commands to create output images. The physical GPU 805 can be configured as multiple virtual GPUs that may be used in parallel (e.g., concurrently) by a number of applications or processes executing in parallel, or multiple physical GPUs may be used simultaneously. Graphics sub-system 805 outputs display data to optional display device 810. The display device 810 may be communicatively coupled to the graphics subsystem 805 using HDMI, DVI, DisplayPort, VGA, etc.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of switching operating channels in a wireless network, the method comprising:
    transmitting data to a wireless station (STA) over a primary wireless channel;
    transmitting a trigger frame to the wireless STA during a TXOP over the primary wireless channel and a secondary wireless channel;
    receiving a TB PPDU from the wireless STA over the secondary wireless channel responsive to the trigger frame;
    configuring an operating channel for communicating with the wireless STA to the secondary wireless channel; and
    transmitting data to the wireless STA over the secondary wireless channel, wherein the wireless STA switches back to communicating over the primary wireless channel after the TXOP expires.

2. The method of claim 1, wherein the wireless STA moves to the secondary channel during a trigger MAC padding duration.

3. The method of claim 2, wherein the trigger MAC padding duration comprise 8 µs or 16 µs.

4. The method of claim 1, further comprising transmitting an acknowledgement frame to the wireless STA responsive to the receiving the HE TB PPDU.

5. The method of claim 1, further comprising configuring the operating channel for communicating with the wireless STA to the primary channel after the TXOP has expired.

6. The method of claim 1, wherein the HE TB PPDU comprises a channel width subfield comprising a value of 40 MHz, 80 MHz, 160 MHz, or 80+80 MHz indicating support for wideband channel access.

7. The method of claim 1, wherein the HE TB PPDU comprises a channel width subfield comprising a value of 20 MHz indicating a request to move back to the primary wireless channel.

8. A method of switching operating channels of a wireless station in a wireless network, the method comprising:
    receiving data from a wireless access point (AP) over a primary wireless channel;
    receiving a trigger frame from the wireless AP during a TXOP over a secondary wireless channel;
    transmitting a TB PPDU to the wireless AP over the secondary wireless channel responsive to the trigger frame;
    configuring an operating channel for communicating with the wireless AP to the secondary wireless channel;
    receiving data from the wireless AP over the secondary wireless channel; and
    receiving data from the wireless AP over the primary wireless link after the TXOP expires.

9. The method of claim 8, wherein the receiving the trigger frame from the wireless AP is performed during a trigger MAC padding duration.

10. The method of claim 9, wherein the trigger MAC padding duration comprise 8 µs or 16 µs.

11. The method of claim 8, further comprising receiving an acknowledgement frame from the wireless STA responsive to the transmitting the HE TB PPDU.

12. The method of claim 8, further comprising switching the operating channel for communicating with the wireless AP to the primary channel after the TXOP has expired.

13. The method of claim 8, wherein the HE TB PPDU comprises a channel width subfield comprising a value of 40 MHz, 80 MHz, 160 MHz, or 80+80 MHz indicating support for wideband channel access.

14. The method of claim 8, wherein the HE TB PPDU comprises a channel width subfield comprising a value of 20 MHz indicating a request to move back to the primary wireless channel.

15. A device for providing wideband channel access to a wireless station (STA), the device comprising:
    a memory for storing data; and
    a processor communicatively coupled to the memory and configured to execute instructions for providing wideband channel access, the method comprising:
        transmitting data to a wireless station (STA) over a primary wireless channel;
        transmitting a trigger frame to the wireless STA during a TXOP over the primary wireless channel and a secondary wireless channel;
        receiving a TB PPDU from the wireless STA over the secondary wireless channel responsive to the trigger frame;
        configuring an operating channel for communicating with the wireless STA to the secondary wireless channel; and
        transmitting data to the wireless STA over the secondary wireless channel, wherein the wireless STA switches back to communicating over the primary wireless channel after the TXOP expires.

16. The device of claim 15, wherein the trigger frame is received by the wireless STA during a trigger MAC padding duration.

17. The device of claim 15, wherein the trigger MAC padding duration comprise 8 µs or 16 µs.

18. The device of claim 15, wherein the method further comprises transmitting an acknowledgement frame to the wireless STA responsive to the receiving the HE TB PPDU.

* * * * *